(No Model.)
W. H. CHASE.
CORN HARVESTING MACHINE.
No. 432,725. Patented July 22, 1890.
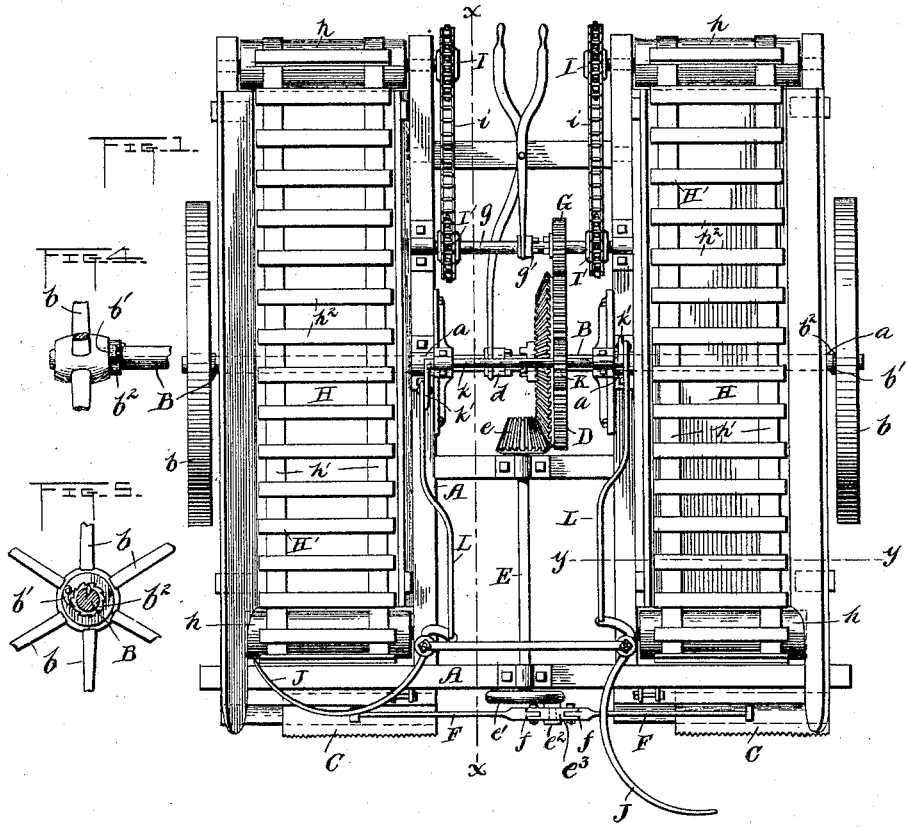
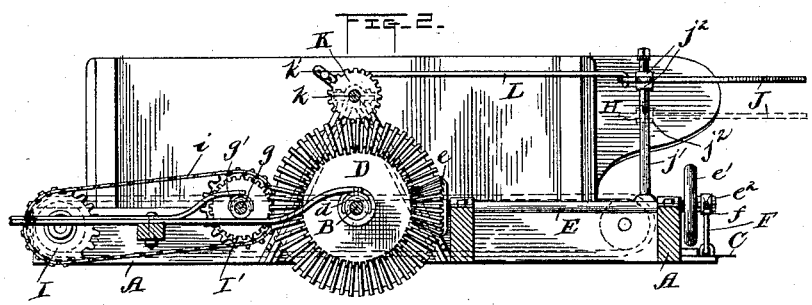
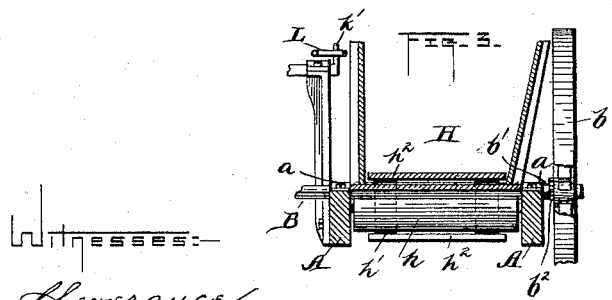
Witnesses:
Severance
W. J. Borden
Inventor:
William H. Chase,
By L. Deane
his Attorney.

UNITED STATES PATENT OFFICE.

WILLIAM H. CHASE, OF HOLTON, KANSAS.

CORN-HARVESTING MACHINE.

SPECIFICATION forming part of Letters Patent No. 432,725, dated July 22, 1890.

Application filed February 12, 1890. Serial No. 340,121. (No model.)

*To all whom it may concern:*

Be it known that I, WILLIAM H. CHASE, a citizen of the United States, residing at Holton, in the county of Jackson and State of Kansas, have invented certain new and useful Improvements in Corn-Harvesting Machines; and I do hereby declare the following to be a full, clear, and exact description of the invention, such as will enable others skilled in the art to which it appertains to make and use the same.

The invention relates to improvements in harvesters, and is intended more particularly to cut Indian corn or maize and sorghum; and it consists in the construction and novel combination of parts, hereinafter described, illustrated in the accompanying drawings, and pointed out in the claims hereto appended.

In the accompanying drawings, in which similar letters of reference indicate corresponding parts, Figure 1 represents a plan view of a harvester embodying the invention. Fig. 2 is a longitudinal section thereof on the line $x\ x$ of Fig. 1. Fig. 3 is a transverse section of the same on the line $y\ y$ of Fig. 1. Fig. 4 represents a detail side view of one of the hubs with its attachments. Fig. 5 represents a detail end view of the same.

Referring to the drawings by letter, A designates the main frame of the machine, of general rectangular construction and having secured about centrally to its longitudinal beams bearings $a$, in which the axle B is mounted. The said axle has mounted on its ends the conveying-wheels $b$, which have upon their hubs the pivoted spring-controlled pawls $b'$, that engage ratchets $b^2$ on the axle and cause the axle to turn with the wheel when the machine is going forward, but permit the wheels to turn on the axle when going backward. The machine is essentially double, having two cutter-bars having saw-teeth on their cutting-edges, and similar parts similarly arranged in rear of said bars.

C C designate cutter-bars or saws on either side reciprocating in suitable recesses or grooves in guide-bars at the front end of the machine.

The following is the mechanism by means of which the cutter-bars or saws are reciprocated.

D is a large gear-wheel, or a gear-wheel having an ordinary spur portion and a bevel portion, as shown. The wheel D is mounted on the axle and can turn loosely thereon, but may be made to turn therewith by means of the splined clutch $d$ and a suitable operating-lever. The bevel portion of the wheel D meshes with a bevel-pinion $e$ on the inner end of a longitudinal shaft E, journaled in bearings secured to the main frame. Secured to the outer end of the shaft E is a disk $e'$, having upon it a wrist-pin $e^2$, that has its outer end attached to a coupling-block $e^3$, connecting the adjacent stub-heads $f$ on the inner ends of the pitmen F, the outer ends of which are pivoted or loosely engaged to staples or loops rising from the saws or cutter-bars. It is evident that the rotation of the wheel D with the axle will by means of the connecting mechanism reciprocate the outer bars.

G is a pinion meshing with the spur portion of the wheel D and mounted loosely on a shaft $g$, journaled on the main frame parallel to and in rear of the axle. The pinion G can be caused to rotate with the shaft $g$ by means of a splined clutch or coupling $g'$ and a suitable lever to move said coupling.

On each side of the main frame and extending longitudinally in rear of the corresponding saw or cutter-bar is a chamber or compartment H, having a transverse roller $h$ journaled in it near each end, which rollers are connected by a carrier-apron H', composed of the belts $h'$ and the transverse slats $h^2$, connecting the said belts.

To the inner end of the shaft of each rear roller $h$ is secured a sprocket-wheel I, a similar sprocket-wheel I' being mounted on the shaft $g$ in front of the former. These sprocket-wheels on each side are connected by chains $i$, which will be caused to travel by the rotation given to the shaft $g$ from the axle and will cause the carrier-apron to travel. When the gear-wheel G is thrown out of gear with the coupling $g'$, the said wheel will rotate loosely on the shaft $g$ and the carrier-aprons will come to rest.

J J are gathering-arms having eyes at their inner ends, which eyes are mounted upon shafts $j'$ between collars $j^2$, which are vertically adjustable on said shafts to regulate the height of the gathering-arms. The said arms curve forward and outward and are swung to gather the cut grain on the front parts of the carrier-aprons by the following means.

K is a pinion mounted on a transverse shaft $k$ above the axle and journaled in bearings in triangular frames rising from the main frame. The said pinion meshes with the spur-edge of the wheel D. The shaft $k$ has the crank-arms $k'$ $k'$ at its ends, which connect with the link-rods L, the outer or front ends of said rods being connected by pivots or other suitable joints to the rear arms or extensions of the gathering-arms, so that said cranks will cause the gathering-arms J to swing into the grain in front of the cutter-bars and drag it upon the carrier-aprons.

When the machine is not in operation, the gear-wheel D has its clutch opened, so that it will be loose on the axle and will not rotate therewith. This is done when going to a field or when turning. The clutch $g'$ of the pinion G is left open till the carriers are full of grain. They are then closed, so that the carriers travel and dump their loads at the rear of the machine.

Having described my invention, I claim—

1. The combination, with the gear-wheel D on the axle, the longitudinal shaft E, the pinion $e$ on the rear end of said shaft meshing with the wheel D, the disk $e'$ on the front end of said shaft, the reciprocating cutter-bars, and the pitmen and block connecting said cutter-bars with said disk, of the swinging arms above the cutter-bars, the carrier-aprons behind said cutter-bars, and mechanism, substantially as described, whereby said aprons and arms are actuated, substantially as specified.

2. The combination, with the axle, the conveyer-wheels thereon, and the larger gear-wheel mounted on the axle, of the transverse shaft above the axle and having cranks on its ends, the pinion on said shaft meshing with said gear-wheel, the swinging arms above the cutter-bars, and the link-rods connecting said arms and the said cranks, substantially as specified.

3. In a harvester, the combination, with the axle, the conveyer-wheels, and the gear-wheel D, mounted on the axle, of the shaft E, the pinion $e$ thereon meshing with the gear-wheel D, the disk $e'$, mounted on the outer end of the shaft E and provided with a wrist-pin $e^2$, the reciprocating cutter-bars, the pitmen connected thereto, and the coupling-block connecting the facing ends of the pitmen and loosely connected to the wrist-pin $e^2$, substantially as specified.

4. The combination, with the axle, the wheel D thereon, the shaft E, having the pinion $e$ on its inner end and the disk $e'$, provided with a wrist-pin $e^2$, on its outer end, the reciprocating cutter-bars, and the pitmen and coupling-block loosely connecting said cutter-bars to the wrist-pin $e^2$, of the transverse shaft above the axle and having cranks at its ends, the pinion on said shaft meshing with the gear-wheel D, shafts $j'$ in rear of the cutter-bars, the swinging arms mounted on said shafts above the cutter-bars, and the link-rods connecting said arms and said cranks, substantially as specified.

In testimony whereof I affix my signature in presence of two witnesses.

WILLIAM H. CHASE.

Witnesses:
A. D. WALKER,
JAMES H. LOWELL.